(12) United States Patent
Dames et al.

(10) Patent No.: US 9,010,451 B2
(45) Date of Patent: Apr. 21, 2015

(54) AGRICULTURAL TOOLBAR TRANSPORT SYSTEM

(71) Applicants: Matthew W. Dames, Clarion, IA (US); Matthew A. Dorenkamp, Mason City, IA (US); Michael S. Meyer, Clear Lake, IA (US); James R. Williams, Clarion, IA (US); Ashok K. Rana, Clarion, IA (US)

(72) Inventors: Matthew W. Dames, Clarion, IA (US); Matthew A. Dorenkamp, Mason City, IA (US); Michael S. Meyer, Clear Lake, IA (US); James R. Williams, Clarion, IA (US); Ashok K. Rana, Clarion, IA (US)

( * ) Notice: Subject to any disclaimer, the term of this patent is extended or adjusted under 35 U.S.C. 154(b) by 154 days.

(21) Appl. No.: 13/899,208

(22) Filed: May 21, 2013

(65) Prior Publication Data

US 2014/0345888 A1    Nov. 27, 2014

(51) Int. Cl.
*A01B 73/00* (2006.01)
*A01B 73/06* (2006.01)

(52) U.S. Cl.
CPC .................................. *A01B 73/065* (2013.01)

(58) Field of Classification Search
USPC ................. 16/338, 348, 367; 111/54, 57, 59; 172/311, 456, 459, 482, 630, 624.5, 172/654, 677; 280/656; 403/278
See application file for complete search history.

(56) References Cited

U.S. PATENT DOCUMENTS

| | | | | |
|---|---|---|---|---|
| 4,529,040 A * | 7/1985 | Grollimund | ................... | 172/311 |
| 4,632,417 A * | 12/1986 | Hodapp | ........................ | 172/311 |
| 6,374,921 B1 * | 4/2002 | Friggstad | ...................... | 172/311 |
| 6,408,950 B1 * | 6/2002 | Shoup | ............................ | 172/311 |
| 6,691,794 B2 * | 2/2004 | Paluch et al. | ................. | 172/679 |
| 7,429,003 B2 * | 9/2008 | Thompson et al. | ........... | 239/167 |
| 8,342,256 B2 * | 1/2013 | Adams et al. | ................. | 172/311 |
| 8,727,032 B2 * | 5/2014 | Friggstad | ...................... | 172/311 |

* cited by examiner

*Primary Examiner* — Robert Pezzuto
(74) *Attorney, Agent, or Firm* — Brett J. Trout P.C.

(57) ABSTRACT

A toolbar transport system for extending and retracting a large agricultural toolbar. Forward and rearward folding segments of the toolbar allow the toolbar assembly to retract against the sides of the vehicle without interfering with the steering wheels. A forward-folding segment and rearward-folding segment of each lateral toolbar section connect to provide steering wheel clearance in the transfer position and an integrated lateral toolbar with regularly-spaced ground-engaging implements in the application position. Gauge wheel assemblies assist in the extension and deployment of the toolbar assembly.

20 Claims, 6 Drawing Sheets

AGRICULTURAL TOOLBAR TRANSPORT SYSTEM

TECHNICAL FIELD

The present invention relates in general to an agricultural toolbar and, more particularly, to a transport system that allows compact weight distributed transport of an agricultural toolbar without interfering with the steering system.

BACKGROUND

Toolbars are known in the art for use in association with various agricultural pursuits, including seeding, fertilizing, plowing and the like. These systems typically involve a generally horizontal bar provided with several depending implements to modify a particular area of ground. It is desirable to provide a toolbar with as many depending implements as possible to treat as many rows as possible, during a single pass of the toolbar. As it is difficult to move very large toolbars on the highway, most toolbars are designed with a folding capability, which allows the toolbar to be folded for transport and extended to use.

While it is possible to fold spray booms rearward to evenly distribute the weight of the spray boom, folding back of a toolbar with depending implements places the implements too close to the front tire of the vehicle to allow the vehicle to turn without the tire contacting the depending implement.

It is also known in the art to fold the toolbar in front of the vehicle. Such systems, however, place a large amount of weight near the front of the vehicle, leading to instability of the vehicle. Such forward-folded systems also obscure a portion of the roadway from the operator.

While it would be possible to fold a large toolbar rearward in a manner that maintains the rearward portions of the toolbar a sufficient distance away from the wheels to allow an adequate turn radius, such an orientation significantly increases the width of the vehicle during transport, making it less desirable to operate on narrow and busy roadways.

It would, therefore, be desirable to provide a toolbar transport system that allows for the use of a long toolbar that may be folded to more evenly distribute the weight of the toolbar, allow close placement of the toolbar to the vehicle to reduce overall width, while allowing the wheels to turn adequately without contacting the implements depending from the toolbar.

The difficulties encountered in the prior art discussed hereinabove are substantially eliminated by the present invention.

SUMMARY OF THE DISCLOSED SUBJECT MATTER

In the preferred embodiment of this invention, an agricultural vehicle is provided with a ground-engaging toolbar. The toolbar has a boom assembly with a plurality of depending ground-engaging agricultural implements. The boom is divided into three sections, a center section coupled to two side sections. Each side section is provided with a forward-folding segment and a rearward-folding segment. When it is desired to transport the toolbar, the rearward-folding segments are retracted along the sides of the agricultural vehicle in a direction generally parallel to the direction of travel. The forward-folding segments are rotated forward so they are also generally parallel to the direction of travel. By folding the forward-folding segments forward, the ground-engaging agricultural implements depending therefrom are out of the way of the front wheels of the vehicle, allowing the vehicle to turn without the wheels contacting the implements depending from the forward-folding segment.

When it is desired to use the boom assembly to apply material to a field, the forward-folding segment and rearward-folding segment on each side of the boom are rotated to a position generally perpendicular to the direction of vehicle travel, and locked. Each forward-folding segment is locked into engagement with the associated rearward folding segment to produce a single boom with regularly spaced depending ground-engaging agricultural implements. Gauge wheel assemblies are secured to the center and side boom assemblies to assist in lifting the boom assemblies to set the height of the toolbar when in use, and to prevent the boom assemblies from destabilizing the vehicle.

BRIEF DESCRIPTION OF THE DRAWINGS

The present invention will now be described, by way of example, with reference to the accompanying drawings in which.

DETAILED DESCRIPTION OF THE DRAWINGS

Figure 1:
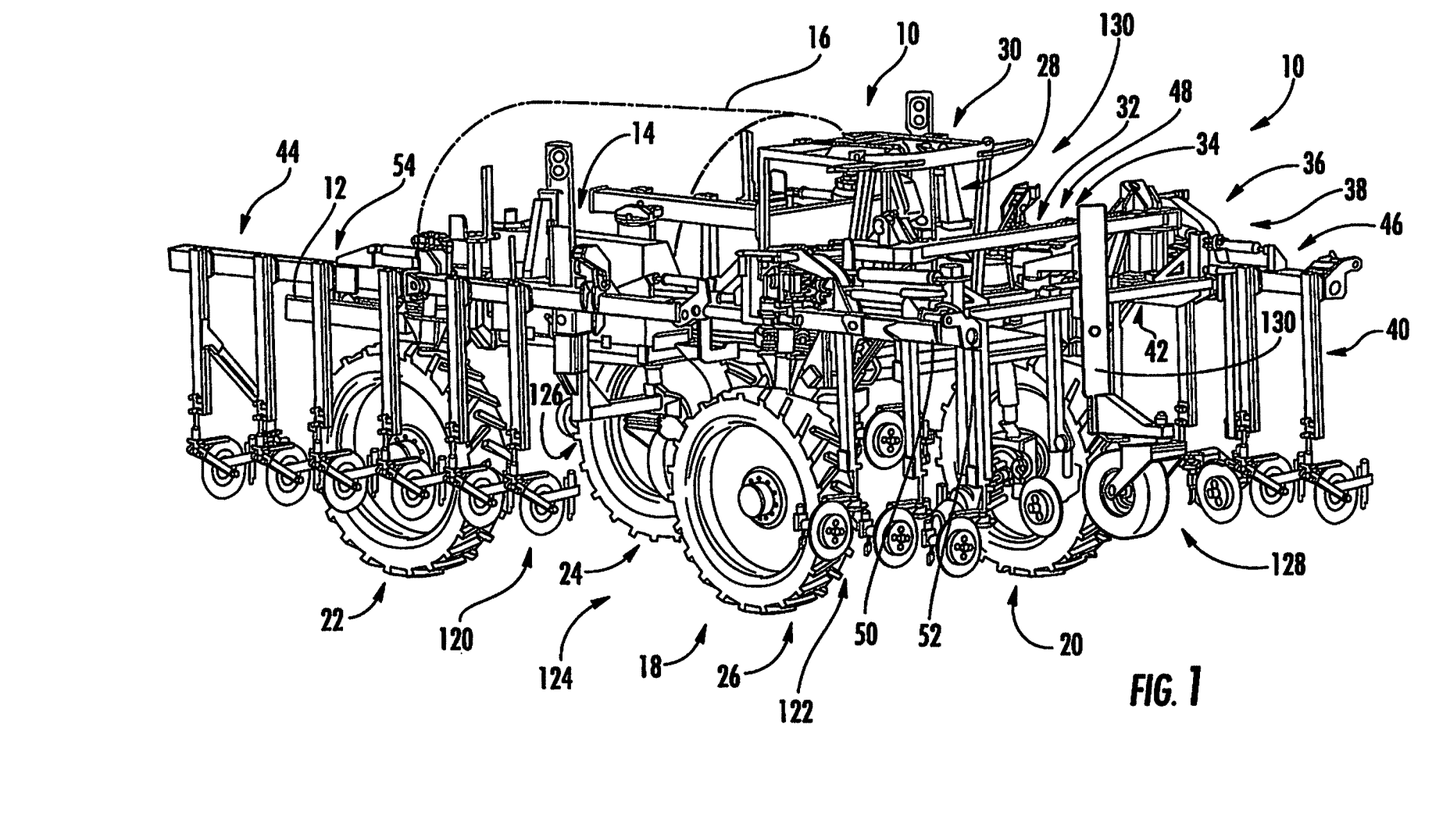
FIG. 1 illustrates a front perspective view of the agricultural vehicle of the present invention.

A vehicle is shown generally as (10) in FIG. 1. The vehicle (10) is provided with a frame (12), a motor (14), a tank (16) and a plurality of wheels (18), (20), (22) and (24) coupled to the frame (12). The wheels (18-24), which include the tires (26), are preferably more than 1.0 meter in diameter, and most preferably more than 1.5 meters in diameter. The wheels (18) and (20) are provided with a width less than half their diameter. Preferably, the front wheels (18) and (20) are coupled to a steering assembly (28) provided in a cab (30) in a manner such as that known in the art. Most preferably, all four wheels (18-24) are coupled to the steering assembly (28).

While the vehicle (10) may be of any type known in the art, in the preferred embodiment, the vehicle (10) is an STS sprayer, manufactured by Hagie Manufacturing Company, Clarion, Iowa. Provided on the vehicle (10) is a hydraulically actuated toolbar mount (32). The toolbar mount (32) includes a four-bar parallel linkage (34), such as those known in the art to maintain a ground-engaging toolbar assembly (36) perpendicular to the ground as the toolbar mount (32) is raised and lowered.

As shown in FIG. 1, the toolbar assembly (36) has a boom assembly (38) and a plurality of ground-engaging agricultural implements (40) depending therefrom in a manner such as that known in the art. The toolbar assembly (36) is preferably more than 2000 kilograms, more preferably greater than 3000 kilograms, and most preferably greater than 4500 kilograms. The boom assembly (38) has a center boom assembly (42) coupled to a first lateral boom assembly (44) and a second lateral boom assembly (46).

The boom assembly (38) is preferably at least 15.0 meters in length, more preferably at least 16.5 meters in length and, most preferably, at least 18.0 meters in length. To accommodate the greater draw weight associated with such a large boom assembly, the center boom assembly (42) is provided with a larger frame (48) to prevent stress fracture or deformation. As the first lateral boom assembly (44) and second lateral boom assembly (46) are mirror images of one another, this description will be limited to the first lateral boom assembly (44).

Figure 2:
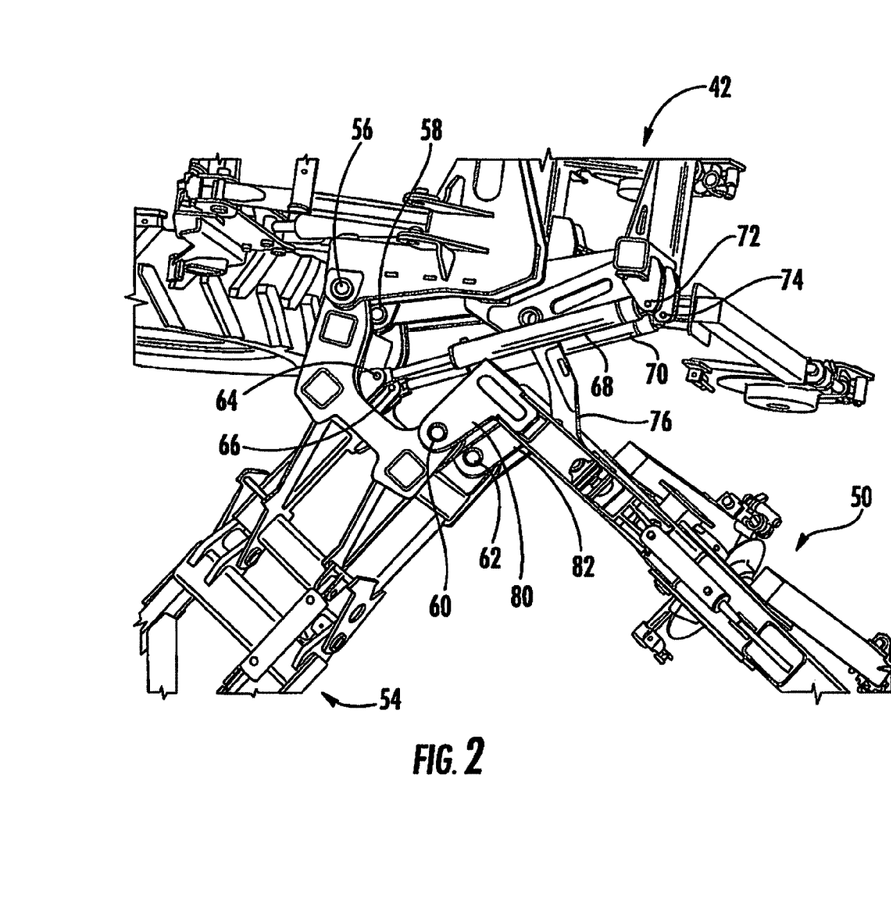
FIG. 2 illustrates a top perspective view of the folding boom assembly of the present invention.

The first lateral boom assembly (44) has a forward folding segment (50) having a free end (52) and a rearward-folding segment (54). As shown in FIG. 2, the rearward-folding segment (54) is coupled to the center boom assembly at two pivot points (56) and (58). Similarly, the forward-folding segment (50) is pivotally coupled to the rearward-folding segment (54) at a pair of pivot points (60) and (62). Alternatively, the rearward-folding segment (54) may be coupled to the center boom assembly (42) and forward fold segment (50) at single pivot points.

As shown in FIG. 2, between the pivot points (56) and (58), and the pivot points (60) and (62), are a pair of ears (64) and (66) coupled to a pair of linear actuators (68) and (70) which, in the preferred embodiment, are hydraulic cylinders. The opposite end of the linear actuators (68) and (70) are coupled to a pair of ears (72) and (74) provided on the center boom assembly (42).

Figure 3:
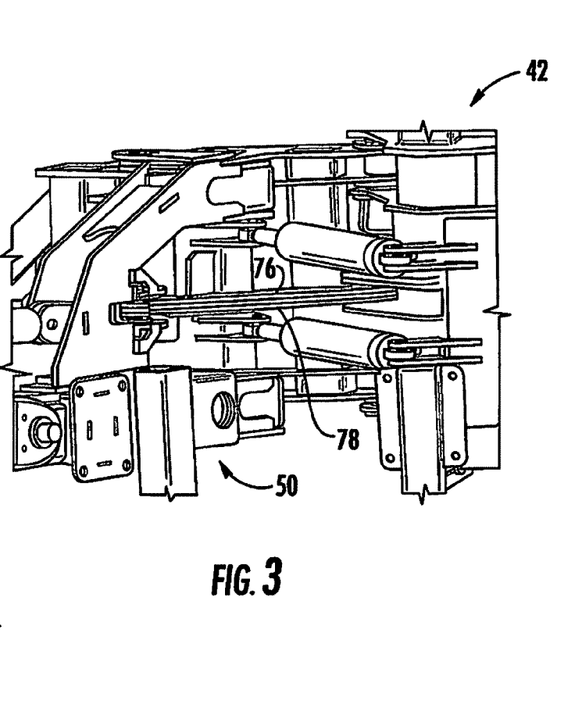
FIG. 3 illustrates a side perspective view of the folding boom assembly of FIG. 2.

As shown in FIGS. 2 and 3, coupled between the center boom assembly (42) and forward-folding segment (50) is a linkage (76). The linkage (76) may be constructed of any suitable material. In the preferred embodiment, the linkage (76) is a steel plate (78). The linkage (76) is preferably curved to accommodate the configuration of the forward-folding segment (50) and rearward-folding segment (54) during extension and retraction, but may be of any desired construction or configuration. While a single linkage (76) is provided between the linear actuators (68) and (70) is shown, any desired number of linkages (76), in any configuration relative to the linear actuators (68) and (70) may be provided.

As shown in FIG. 2, the forward-folding segment (50) is coupled to the rearward-folding segment (54) by a pair of ears (80) and (82) to allow the forward-folding segment (50) to rotate from a first point generally parallel in an end-to-end configuration relative to the rearward-folding segment (54) during transport, and to a second point generally parallel in a side-by-side orientation with the rearward-folding segment (54) during application.

Figures 4, 5:
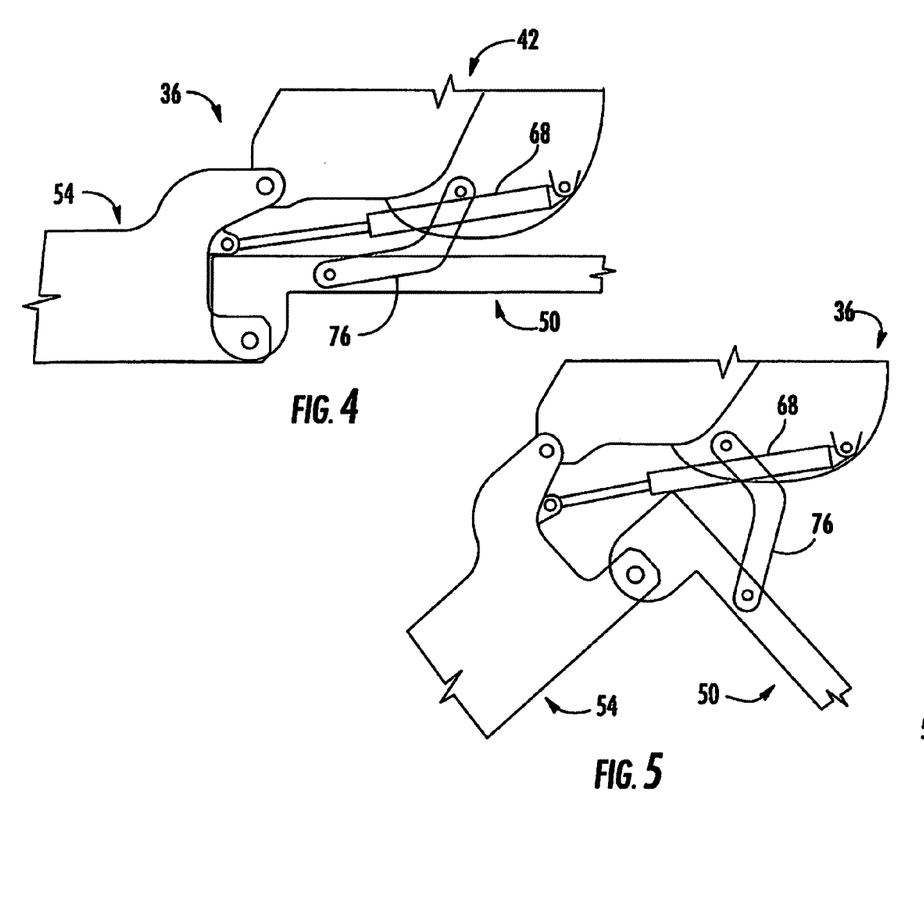
FIG. 4 illustrates a top view in partial cross-section of the folding boom assembly in the transport position.
FIG. 5 illustrates a view in partial cross-section of the folding boom assembly of FIG. 4, shown being extended to the application position.

As shown in FIG. 4, when the toolbar assembly (36) is in a transport orientation, the center of mass of the rearward-folding segment (54) is positioned rearward of the center boom assembly (42) and the center of mass of the forward-folding segment (50) is positioned forward of the rearward-folding segment (54) and generally forward of the center boom assembly (42). As shown, in this orientation, the linear actuators (68) and (70) are fully extended, (FIGS. 2-4), and the linkage (76) is angled rearward.

As shown in FIG. 5, when it is desired to extend the toolbar assembly (36) for application, the operator (not shown) actuates the linear actuators (68) and (70) to fold the rearward-folding segment (54). As the rearward-folding segment (54) rotates, the rearward-folding segment (54) and linkage (76) force the forward-folding segment (50) from its forward orientation toward a lateral orientation.

Figure 6:
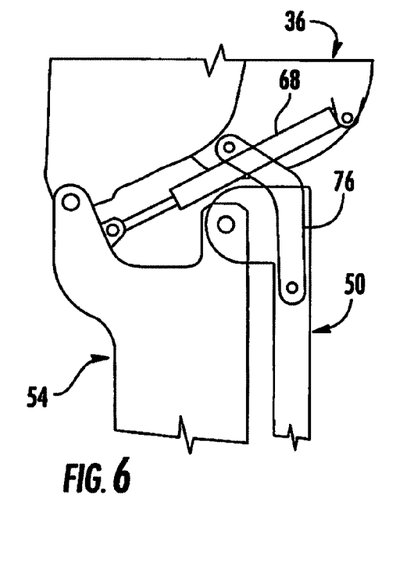
FIG. 6 illustrates a view in partial cross-section of the folding boom assembly of FIG. 4, shown in the application position.

As shown in FIG. 6, once the linear actuators (68) and (70) have been fully retracted, the forward-folding segment (50) is in the generally parallel side-by-side relationship to the rearward-folding segment (54) with the center of mass of the forward-folding segment (50) no longer forward of the center boom assembly (42). (FIGS. 2 and 6).

Figure 7:
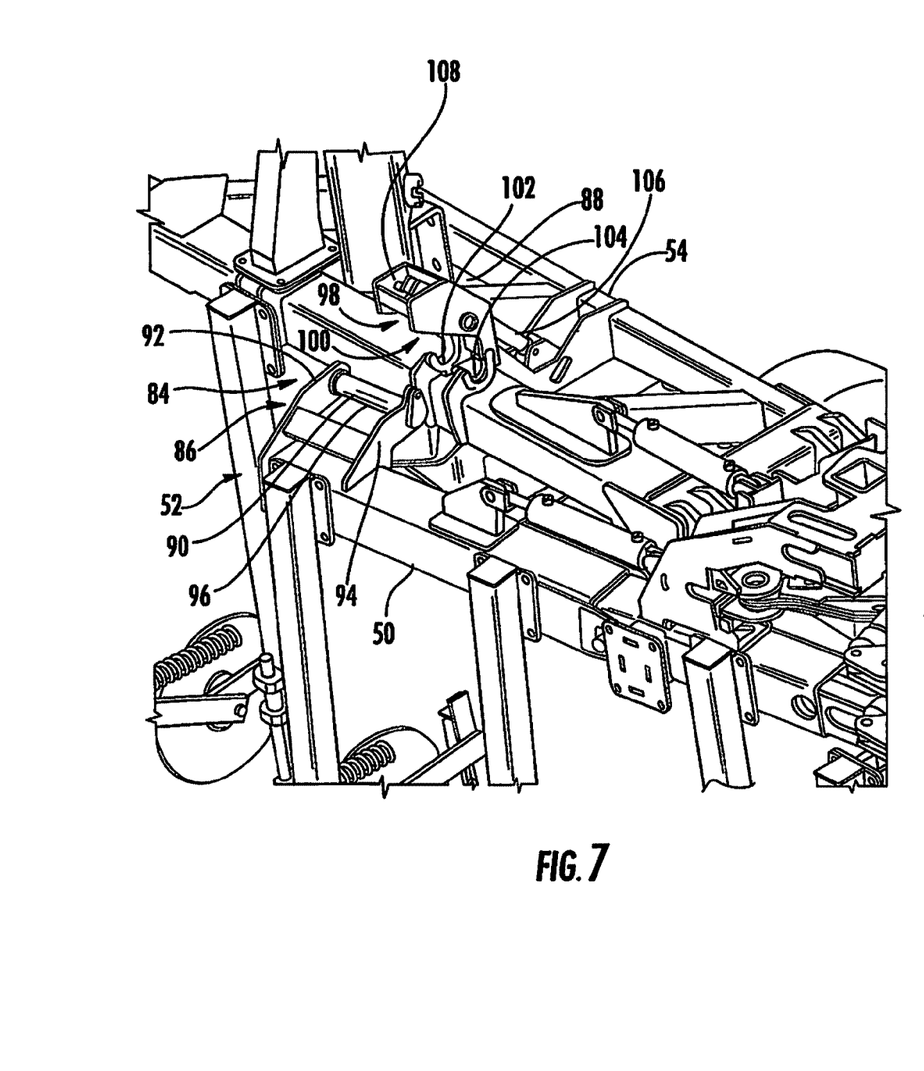
FIG. 7 illustrates a side perspective view of the latch system of the present invention.
Figure 8:
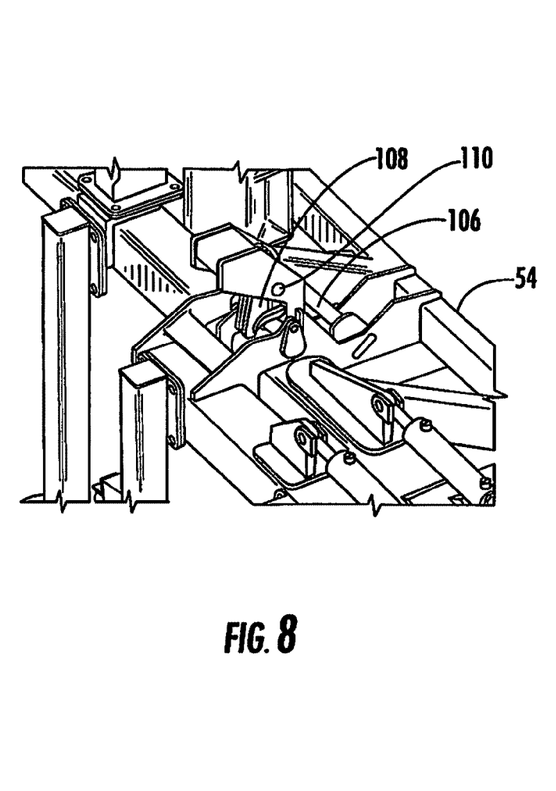
FIG. 8 illustrates a side perspective view of the latch system of FIG. 7, shown in the latched position.

As shown in FIGS. 7 and 8, when the forward-folding segment (50) and rearward-folding segment (54) are folded into the application position by the linear actuators (68) and (70), (FIGS. 2 and 7), the free end (52) of the forward-folding segment (50) is secured to the rearward-folding segment (54) by a latch assembly (84). The latch assembly (84) has a first latch (86) coupled to the free end (52) of the forward-folding segment (50) and a second latch (88) coupled to the rearward-folding segment (54). The first latch (86) is a steel pin (90) coupled to a pair of steel shoulders (92) and (94), welded to the free end (52) of the forward-folding segment (50). Provided over the steel pin (90) is a nylon sleeve (96) such as those known in the art to reduce deformation of the pin (90) during the latching and unlatching process.

The latch (88) has a pair of chamfered faces (98) and (100) to guide the pin (90) into engagement with a pair of hooks (102) and (104). Once the pin (90) has been engaged by the hooks (102) and (104), the operator actuates a latch cylinder (106). Preferably, the latch cylinder (106) is a hydraulic cylinder coupled between the rearward-folding segment (54) and a steel keeper (108). The keeper (108) is a plurality of steel plates pivotally engaged to the chamfered face (98) by a pin (110). The latch cylinder (106) rotates the keeper (108) into and out of engagement with the pin (90) to prevent inadvertent dislodgement of the pin (90) from the hooks (102) and (104) during the application process.

As shown in FIGS. 2, 7 and 8, the latch (88) is provided at a point along the rearward-folding segment (54) which is preferably more than 0.5 meter, more preferably more than 1.0 meter and, most preferably more than 1.5 meters from the point at which the rearward-folding segment (54) is pivotally coupled to the forward-folding segment (50).

Figure 9:
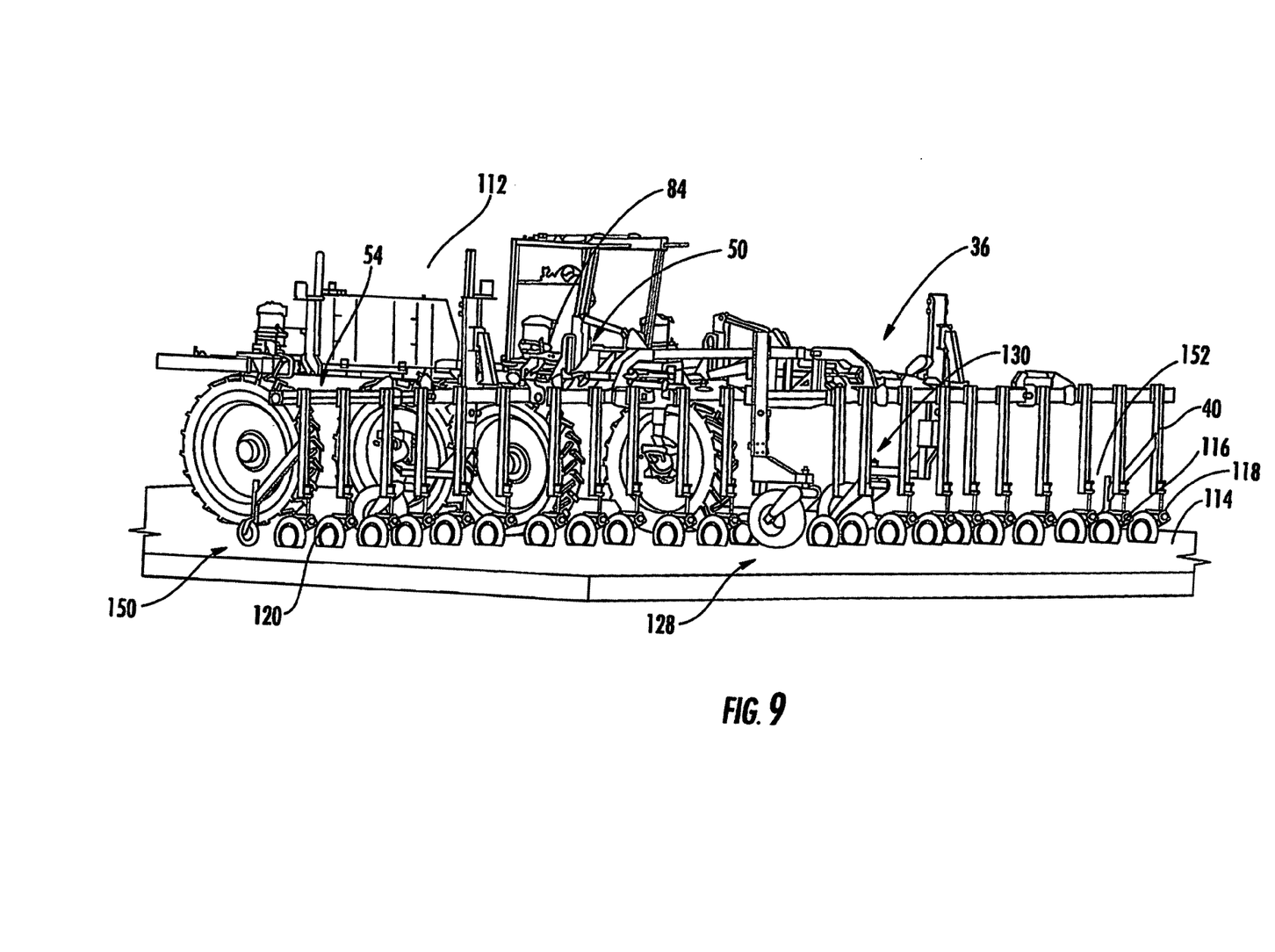
FIG. 9 illustrates a side perspective view of the agricultural vehicle of the present invention shown in the application position.

As shown in FIG. 9, once the forward-folding segment (50) has been secured to the rearward-folding segment (54) by the latch assembly (84), the toolbar assembly (36) is ready for application of nitrogen, or other material, into the field (114) through nozzles (116) provided behind the coulters (118) of the ground-engaging implements (40) in a manner such as that known in the art.

When it is desired to transport the toolbar assembly (36), the operator actuates the latch cylinder (106) to move the keeper (108) so that the pin (90) may be removed from the hooks (102) and (104). (FIGS. 7-9). After the latch cylinder (106) has moved the keeper (108), the operator actuates the linear actuators (68) and (70) to force the rearward-folding segment (54) rearward, which, in turn, forces the forward-folding segment (50) forward. (FIGS. 2-3 and 7-8). This actuation causes the pin (90) to move out of the hooks (102) and (104) and allows the free end (52) of the forward-folding segment (50) to move forward.

As shown in FIG. 5, the extension of the linear actuators (68) and (70) cause the rearward-folding segment (54) to continue folding rearward until the forward-folding segment (50) and rearward-folding segment (54) are in a generally parallel side-by-side orientation, such as that shown in FIG. 4, with the segments (50) and (54) generally parallel to the forward direction of the travel of the vehicle (10). As the toolbar assembly (36) is heavy, the transport orientation of the toolbar assembly (36), such as that shown in FIG. 1, allows for even distribution of the weight of the toolbar assembly (36), as opposed to prior art methods which locate the weight of the toolbar assembly (36) forward of the vehicle (10). Additionally, by placing the first lateral boom assembly (44) and second lateral boom assembly (56) along the sides of the vehicle for transport, the view of the road in front of the vehicle (10) is less obstructed, thereby allowing for greater visibility of the road by the operator. Another advantage of placing the first lateral boom assembly (44) and second lateral boom assembly (46) along the sides of the vehicle (10) is the greater maneuverability of the vehicle (10) during transport. Without the entire bulk of the toolbar assembly (36) in front of the vehicle (10), the vehicle (10) can travel into ditches and the like without the toolbar assembly (36) contacting the forward end of the ditch.

Another advantage associated with the orientation of the toolbar assembly (36) shown in FIG. 1, is the decreased width of the toolbar assembly (36). By placing the first lateral boom assembly (44) and second lateral boom assembly (46) close to the vehicle (10), the overall dimension of the boom assembly preferably can be reduced from over 18.0 meters to less than 6.0 meters, and more preferably from about 18.7 meters to about 5.2 meters. Preferably, in this orientation, at least fifty percent of the weight of the toolbar assembly (36) is rearward of the center boom assembly (42), more preferably at least sixty percent is rearward of the center boom assembly (42) and, most preferably at least seventy percent of the weight of the toolbar assembly (36) is rearward of the center boom assembly (42).

Without rotating the forward-folding segment (50) forward, the implements (40), depending from the rearward-folding segment (54), would interfere with the turning of the wheels (18 and 20), either damaging the implements (40) or the wheels (18 and 20). To provide the first lateral boom assembly (44) and second lateral boom assembly (46) sufficiently outside the reach of the wheels (18 and 20) during turns, the width of the system would have to be extended to over 7.0 meters, and likely over 7.5 meters. By rotating the forward-folding segment (50) forward, the overall width of the toolbar assembly (36) may be reduced to preferably less than 7.0 meter, more preferably less than 6.0 meters and, most preferably, less than 5.5 meters. In the preferred embodiment, the overall width of the toolbar assembly (36) during transport is 5.18 meters.

As shown in FIG. 1, when the toolbar assembly (36) is in the transport orientation, the innermost implement (120) of the rearward-folding segment (54) and the innermost implement (122) of the forward-folding segment (50) define an open under clearance area (124) under the forward-folding segment (50) and rearward-folding segment (54) preferably at least 1.0 meter high and 1.0 meter wide, more preferably at least 2.0 meters high and 2.0 meters wide and, most preferably at least 2.5 meters wide and 2.5 meters high. The open under clearance area (124) may be of any suitable dimensions sufficient to allow the wheel (18) to turn without contacting the implements (120) and (122).

Figure 10:
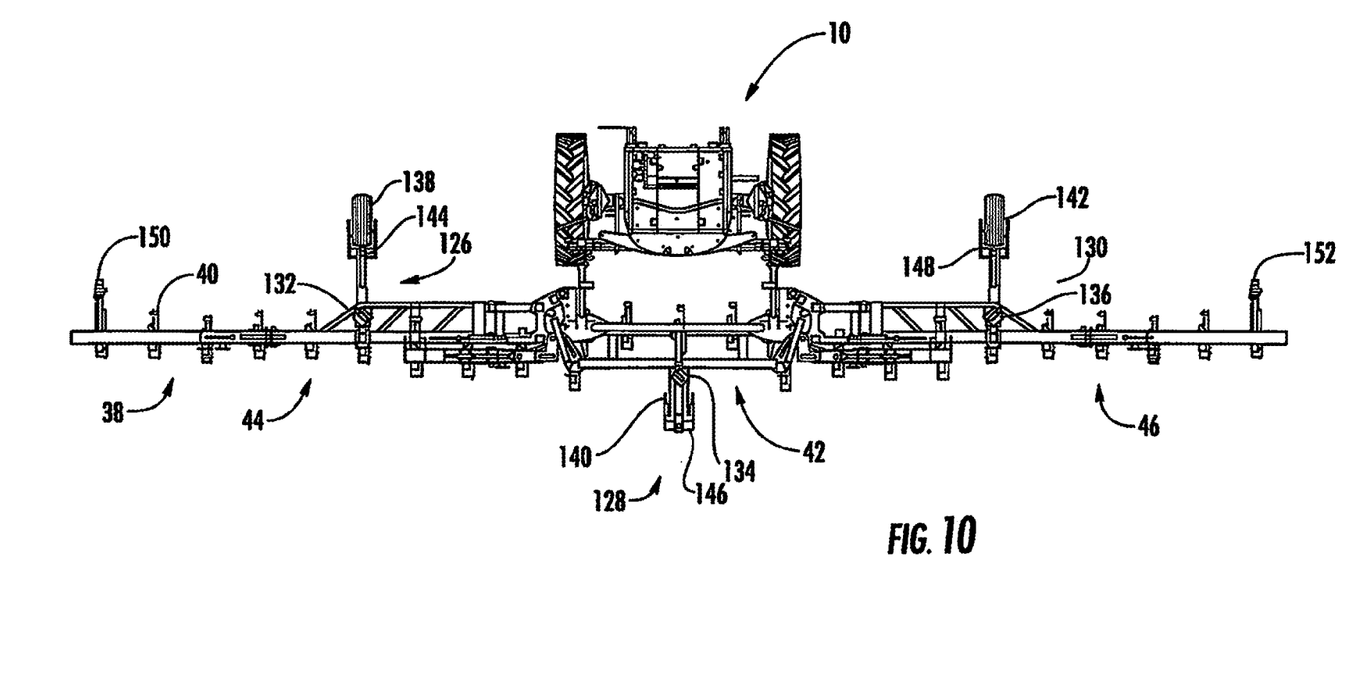
FIG. 10 illustrates a top plan view of the agricultural vehicle of FIG. 9.

As shown in FIG. 1, given the weight of the toolbar assembly (36), four gauge wheel assemblies (126), (128), (130) and (132) are provided. The gauge wheel assemblies (126), (128), (130) and (132) are generally of a similar construction except that the center gauge wheel assembly (128) is provided with larger, stronger components to assist in the lifting of the large center boom assembly (42). When it is desired to move the toolbar assembly (36) to the application orientation, the operator extends the gauge wheel assemblies (126), (128), (130) and (132). Extending the gauge wheel assemblies (126), (128), (130) and (132) involves actuating linear actuators (not shown) provided within the extensible telescoping legs (134), (136), (138) and (140) on the gauge wheel assemblies (126), (128), (130) and (132). The extensible telescoping legs (134), (136), (138) and (140) are coupled to gauge wheels (142), (144), (146) and (148) coupled by caster assemblies (150), (152), (154) and (156). (FIGS. 1 and 10). Once the gauge wheels (142), (144), (146) and (148) engage the ground, and at least partially support the weight of the toolbar assembly (36), the operator can actuate the linear actuators (68) and (70) to extend the first lateral boom assembly (44) and similar actuators (not shown) to extend the second lateral boom assembly (46).

As shown in FIG. 9, if desired, the gauge wheel assemblies (126), (128), (130) and (132) may be partially retracted to support some of the weight of the toolbar assembly (36) during the application process, or may be fully retracted off of the ground to allow the full weight of the toolbar assembly (36) to be supported by the vehicle (10), the implements (40) and support wheels (158) and (160), such as those known in the art. The gauge wheel assemblies (126), (128), (130) and (132) may be provided in any configuration, orientation or number.

As shown in FIG. 10, the vehicle (10) may be provided with non-extensible gauge wheel assemblies (162) and (164). In this embodiment, the two center gauge wheels (166) and (168) are extensible to allow the gauge wheels (166) and (168) to shoulder some of the weight of the toolbar assembly (36) as the toolbar assembly (36) is lifted for retraction and/or turning the vehicle (10) in the field. In this embodiment, when it is desired to turn the vehicle (10) the gauge wheel assemblies (166) and (168) lift the toolbar assembly (36) while the toolbar assemblies (162) and (164) provided on the wings of the toolbar (36) lift off the ground along with the toolbar assemblies (166) and (168) so nothing under the first lateral boom assembly (44) and second lateral boom assembly (46) is in contact with the ground during turning, thereby reducing interference with the ground and facilitating turning of the vehicle (10).

Although the invention has been described with respect to a preferred embodiment thereof, it is to be understood that it is not to be so limited since changes and modifications can be made therein which are within the full, intended scope of this invention as defined by the appended claims.

What is claimed is:

1. An agricultural vehicle comprising:
   (a) a frame;
   (b) a wheel coupled to the frame;
   (c) a motor coupled to the frame;
   (d) a steering assembly coupled to the wheel;
   (e) a tank coupled to the frame;
   (f) a toolbar mount;
   (g) a ground engaging toolbar comprising:
      (i) a boom assembly comprising:
         a. a center boom assembly;
         b. a first boom coupled to the center boom;
         c. a second boom coupled to the center boom; and
         d. wherein the first boom comprises;
            (1) a first forward-folding segment;
            (2) a first rearward-folding segment coupled to the first forward-folding segment at a first point on the first forward-folding segment;
            (3) a latch assembly coupled to the first forward-folding segment at a second point and coupled to the first rearward-folding segment;

(4) wherein the first point is located at least one-half meter from the second point;
e. wherein the second boom comprises:
(1) a second forward-folding segment;
(2) a second rearward-folding segment coupled to the second forward-folding segment at a third point on the second forward-folding segment;
(3) a second latch assembly coupled to the second forward-folding segment at a fourth point and coupled to the second rearward-folding segment;
(4) wherein the third point is located at least one-half meter from the fourth point;
(ii) a third ground-engaging agricultural implement coupled to the second forward-folding segment;
(iii) a fourth ground-engaging agricultural implement coupled to the second rearward-folding segment; and
(iv) wherein the third ground-engaging agricultural implement, the fourth ground-engaging agricultural implement, and the second boom define an open area which extends at least one meter vertically from the ground when the first ground-engaging agricultural implement is engaged to the ground.

2. The agricultural vehicle of claim 1, further comprising an actuator secured to the first rearward-folding segment and the center boom.

3. The agricultural vehicle of claim 2, further comprising a linkage coupled between the first forward-folding segment and the center boom.

4. The agricultural vehicle of claim 1, further comprising a linkage coupled between the first forward-folding segment and the center boom.

5. The agricultural vehicle of claim 4, further comprising a fifth ground-engaging agricultural implement coupled to the center boom.

6. The agricultural vehicle of claim 1, further comprising a fifth ground-engaging agricultural implement coupled to the center boom.

7. The agricultural vehicle of claim 1, further comprising an extensible ground-engaging gauge wheel assembly coupled to the center boom.

8. The agricultural vehicle of claim 7, further comprising a supplemental extensible ground-engaging gauge wheel assembly coupled to the first rearward-folding segment.

9. The agricultural vehicle of claim 1, further comprising a supplemental extensible ground-engaging gauge wheel assembly coupled to the first rearward-folding segment.

10. The agricultural vehicle of claim 1, further comprising;
(a) a first extensible ground-engaging gauge wheel assembly coupled to the center boom;
(b) a first extension actuator coupled to the first extensible ground-engaging gauge wheel assembly;
(c) a second extensible ground-engaging gauge wheel assembly coupled to the first rearward-folding segment;
(d) a second extension actuator coupled to the second extensible ground-engaging gauge wheel assembly;
(e) a third extensible ground-engaging gauge wheel assembly coupled to the second rearward-folding segment; and
(f) a third extension actuator coupled to the third extensible ground-engaging gauge wheel assembly.

11. A ground engaging toolbar comprising:
(a) a center boom assembly;
(b) a first side boom assembly coupled to the center boom assembly;
(c) a second side boom assembly coupled to the center boom assembly;
(d) wherein the first side boom assembly comprises:
(i) a forward-folding segment; and
(ii) a rearward-folding segment hingably coupled to the forward folding segment;
(e) wherein the first side boom assembly is pivotable between the first orientation wherein:
(i) the forward-folding segment is folded forward;
(ii) the rearward-folding segment is folded rearward;
(iii) the forward-folding segment is in a generally end-to-end and parallel configuration with the rearward-folding segment;
(iv) the first side boom is generally parallel to the forward vehicle direction of travel;
and a second orientation wherein:
(i) the forward-folding segment is extended laterally;
(ii) the rearward-folding segment is extended laterally;
(iii) the forward-folding segment is in a generally side-by-side and parallel configuration with the rearward-folding segment;
(iv) the first side boom assembly is generally perpendicular to the forward vehicle direction of travel.

12. The ground engaging toolbar of claim 11, further comprising a first latch coupled to the forward-folding segment and a second latch coupled to the rearward-folding segment, wherein the first latch fits into mating engagement with the second latch.

13. The ground engaging toolbar of claim 11, further comprising a first ground-engaging agricultural implement coupled to the forward-folding segment and a second ground-engaging agricultural implement coupled to the rearward-folding segment, wherein the first ground-engaging agricultural implement and the second ground-engaging implement are each at least one meter in length.

14. The ground-engaging toolbar of claim 11, further comprising an actuator secured to the first rearward-folding segment and the center boom.

15. The ground-engaging toolbar of claim 11, further comprising a linkage coupled between the first forward-folding segment and the center boom.

16. The ground-engaging toolbar of claim 11, further comprising an extensible ground-engaging gauge wheel assembly coupled to the center boom.

17. The ground-engaging toolbar of claim 11, further comprising;
(a) a first extensible ground-engaging gauge wheel assembly coupled to the center boom;
(b) a first extension actuator coupled to the first extensible ground-engaging gauge wheel assembly;
(c) a second extensible ground-engaging gauge wheel assembly coupled to the first rearward-folding segment;
(d) a second extension actuator coupled to the second extensible ground-engaging gauge wheel assembly;
(e) a third extensible ground-engaging gauge wheel assembly coupled to the second rearward-folding segment; and
(f) a third extension actuator coupled to the third extensible ground-engaging gauge wheel assembly.

18. A method for articulating a ground-engaging toolbar comprising:
(a) providing a ground-engaging toolbar comprising:
(i) a center boom assembly;
(ii) a first side boom assembly coupled to the center boom assembly;
(iii) a second side boom assembly coupled to the center boom assembly;
(iv) wherein the first side boom assembly comprises:
(1) a forward-folding segment having a free end; and (2) a rearward-folding segment hingably coupled to the forward folding segment;

(b) folding the forward-folding segment forward of the center boom assembly;

(c) folding the rearward-folding segment rearward of the center boom assembly;

(d) folding the forward folding segment generally parallel with the center boom assembly;

(e) folding the rearward-folding segment generally parallel with the center boom assembly; and (f) securing the free end of the forward-folding segment to the rearward-folding segment in a generally parallel configuration.

19. The method for articulating a ground-engaging toolbar of claim 18, further comprising providing a gauge wheel assembly comprising:

(a) an extensible leg coupled to the center boom;

(b) a gauge wheel assembly coupled to the extensible leg; and (c) applying upward pressure on the center boom by extending the extensible leg.

20. The method for articulating a ground engaging toolbar of claim 18, further providing:

(a) a first ground-engaging agricultural implement coupled to the center boom;

(b) a second ground-engaging agricultural implement coupled to the first side boom assembly;

(c) a third ground-engaging agricultural implement coupled the second side boom assembly, and (d) wherein the first ground-engaging agricultural implement, the second ground-engaging agricultural implement, and the third ground-engaging agricultural implement are at least one meter in height.

* * * * *